F. H. LEATHERS.
CATTLE TIE.
APPLICATION FILED AUG. 1, 1910.
1,016,423. Patented Feb. 6, 1912.
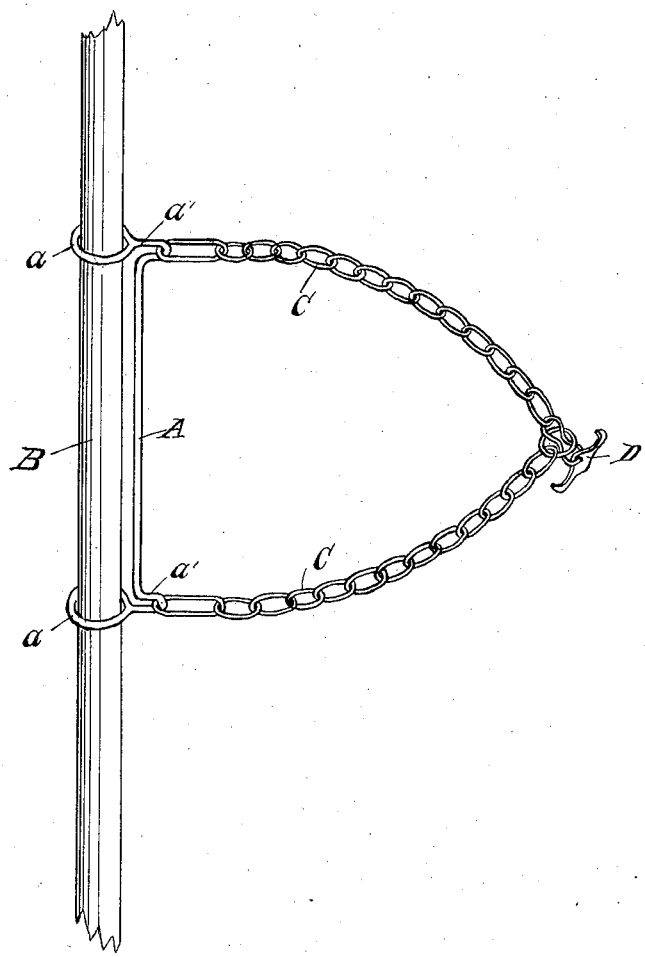

UNITED STATES PATENT OFFICE.

FRANK H. LEATHERS, OF WINN, MAINE.

CATTLE-TIE.

1,016,423.  Specification of Letters Patent.  Patented Feb. 6, 1912.

Application filed August 1, 1910. Serial No. 574,780.

*To all whom it may concern:*

Be it known that I, FRANK H. LEATHERS, citizen of the United States, residing at Winn, in the county of Penobscot and State of Maine, have invented certain new and useful Improvements in Cattle-Ties, of which the following is a specification.

My invention consists of an improved cattle-tie and is fully illustrated in the accompanying drawing which is a perspective side view as applied to a stanchion.

My tie is formed of a stiff metal rod A having an eye $a$ at each end adapted to receive the stanchion B and work easily around it and up and down it, and loops or eyes $a'$ $a'$ preferably adjacent to the eyes $a$ $a$, each of the eyes $a'$ being shaped and adapted to receive an end link of the tie-chain C.

The parts A, $a$ $a$ and $a'$ $a'$ are rigidly connected with each other, or preferably formed integral, and the end links of the tie-chain having been passed over the eyes $a$ $a$ and resting in the loops $a'$ $a'$, the stanchion B is passed through the eye $a$ $a$ and secured in its position in the tie-up. The portion of the rod A between the loops $a'$ $a'$ serves as a spreader and is preferably of a length approximately equal to the vertical diameter of the animal's neck. The animal being led to the stanchion, the tie-chain is passed about its neck and secured by the clog D as commonly.

The chief advantages of my device lie in the facts that it gives the animal all necessary freedom of motion and position and cannot bind and become fixed at any particular point or in any particular position, and hence renders choking or cramping of the animal absolutely impossible while the animal's head cannot be thrown over or under the tie.

I expressly disclaim a tie wherein the eyes are movably connected to the spreader as I am aware that such devices are not novel, and I limit my claim to a tie wherein the eyes are integral or rigid with the spreader.

Having thus described my invention I claim—

A cattle-tie consisting of the combination of a rigid spreader having eyes at each end adapted to fit loosely upon a stanchion and loops between said spreader and said eyes adapted to receive the end links of a tie chain, said spreader, said eyes and said loops being formed integral and rigid; a stanchion adapted to fit loosely within said eyes; and a tie chain adapted to have its end links received and held in said loops, said end links being elongated to admit of being passed over the eyes at the end of the spreader and engage the loops.

In testimony whereof I have signed my name to this specification in the presence of two subscribing witnesses.

FRANK H. LEATHERS.

Witnesses:
J. R. CROMWELL,
L. H. LEATHERS.

Copies of this patent may be obtained for five cents each, by addressing the "Commissioner of Patents, Washington, D. C."